United States Patent
Gardner et al.

(10) Patent No.: US 10,868,680 B2
(45) Date of Patent: Dec. 15, 2020

(54) POWER OVER ETHERNET USING SHIELDED SINGLE TWISTED WIRE PAIR

(71) Applicant: Analog Devices International Unlimited Company, Limerick (IE)

(72) Inventors: Andrew J. Gardner, Santa Barbara, CA (US); Heath Stewart, Santa Barbara, CA (US)

(73) Assignee: Analog Devices International Unlimited Company, Limerick (IE)

( * ) Notice: Subject to any disclaimer, the term of this patent is extended or adjusted under 35 U.S.C. 154(b) by 111 days.

(21) Appl. No.: 16/106,635

(22) Filed: Aug. 21, 2018

(65) Prior Publication Data
US 2019/0068385 A1   Feb. 28, 2019

Related U.S. Application Data

(60) Provisional application No. 62/550,533, filed on Aug. 25, 2017.

(51) Int. Cl.
*G06F 1/26* (2006.01)
*H04L 12/10* (2006.01)
(Continued)

(52) U.S. Cl.
CPC ............. *H04L 12/10* (2013.01); *G06F 1/26* (2013.01); *H02J 1/06* (2013.01); *H02J 1/10* (2013.01);
(Continued)

(58) Field of Classification Search
CPC ...... H04L 12/10; H04L 12/40045; H02J 1/06; H02J 3/02; H02J 1/10; H02J 2207/30; H02J 7/00; G06F 1/26
(Continued)

(56) References Cited

U.S. PATENT DOCUMENTS

| | | | |
|---|---|---|---|
| 2005/0086546 A1* | 4/2005 | Darshan | H04L 69/24 713/300 |
| 2008/0235523 A1* | 9/2008 | Hussain | G06F 1/266 713/300 |

(Continued)

FOREIGN PATENT DOCUMENTS

| | | |
|---|---|---|
| JP | 2016046815 A | 4/2016 |
| WO | 2005036374 A1 | 4/2005 |

OTHER PUBLICATIONS

Chin et al., "Combine Power Feed and Data Link via Cable for Remote Peripherals", EE Times, Nov. 10, 2011, 6 pages.

*Primary Examiner* — Volvick Derose
(74) *Attorney, Agent, or Firm* — Schwegman Lundberg & Woessner, P.A.

(57) ABSTRACT

A PoE system includes a PSE connected via a shielded twisted wire pair to a PD, where differential data is transmitted over only the wire pair, and where DC power is transmitted via the wires in the wire pair conducting a DC voltage in parallel while using the shield conductor as ground. A low power handshaking routine is performed by a PSE controller and a PD controller by conducting a source current through the wires in parallel and a return current through the shield conductor. Center tap auto-transformers are used to connect the two wires to the PSE and PD controllers and to a DC voltage source in the PSE. After a successful handshaking routine, the PSE couples the DC voltage source between the wire pair and the shield conductor by closing a first power switch. The PD controller then closes a second power switch to power a load.

17 Claims, 2 Drawing Sheets

(51) Int. Cl.
*H04L 12/40* (2006.01)
*H02J 1/06* (2006.01)
*H02J 1/10* (2006.01)
*H02J 3/02* (2006.01)
*H02J 7/00* (2006.01)
*G06F 1/3203* (2019.01)

(52) U.S. Cl.
CPC .......... *H02J 3/02* (2013.01); *H04L 12/40045* (2013.01); *G06F 1/3203* (2013.01); *H02J 7/00* (2013.01); *H02J 2207/30* (2020.01)

(58) Field of Classification Search
USPC .......................................................... 713/300
See application file for complete search history.

(56) References Cited

U.S. PATENT DOCUMENTS

| | | | | |
|---|---|---|---|---|
| 2010/0277293 | A1* | 11/2010 | Yu | H04L 12/10 333/24 R |
| 2012/0079294 | A1* | 3/2012 | Diab | H04L 12/10 713/300 |
| 2013/0285468 | A1* | 10/2013 | Yu | H04B 3/548 307/109 |
| 2013/0339765 | A1* | 12/2013 | Diab | H04L 12/10 713/300 |
| 2015/0362966 | A1* | 12/2015 | Darshan | G06F 1/26 713/300 |
| 2016/0054777 | A1* | 2/2016 | Dwelley | G06F 1/3206 710/110 |
| 2016/0064938 | A1* | 3/2016 | Balasubramanian | H04L 12/10 307/11 |
| 2016/0308683 | A1* | 10/2016 | Pischl | H04L 12/10 |

* cited by examiner

POWER OVER ETHERNET USING SHIELDED SINGLE TWISTED WIRE PAIR

CROSS-REFERENCE TO RELATED APPLICATIONS

This application is based on and claims priority to U.S. provisional application Ser. No. 62/550,533, filed Aug. 25, 2017, assigned to the present assignee and incorporated herein by reference.

FIELD OF THE INVENTION

This invention relates to Power over Ethernet (PoE) systems, where power from Power Sourcing Equipment (PSE) is transmitted to a Powered Device (PD) over wires that are also used for conducting differential data signals, typically Ethernet signals, and where a handshaking routine is carried out before the full PoE voltage is applied to the wires.

BACKGROUND

It is known to transmit power over data lines to power remote equipment. Power over Ethernet (PoE) is an example of one such system. In PoE, limited power is transmitted to Ethernet-connected equipment (e.g., VoIP telephones, WLAN transmitters, security cameras, etc.) from an Ethernet switch. DC power from the switch is transmitted over two or more twisted wire pairs in the standard CAT-5 cabling. One or more of the wire pairs may also transmit differential data signals, since the DC common mode voltage does not affect the data. In this way, the need for providing any external power source for the Powered Devices (PDs) can be eliminated. The standards for PoE are set out in IEEE 802.3, incorporated herein by reference.

PoE may use a standardized, low power handshaking routine to ensure the PD is compatible with receiving the DC PoE voltage over the wires. Such handshaking may consist of a low power/voltage signal being generated by the PSE on the wire pairs, and the PD may respond in a characteristic way to identify to the PSE that the PD is PoE-compatible (typically called a detection signature). Such a detection signature may consist of a 25 kohm resistance across the wire pairs. After the PSE has performed detection, a low power routine may be carried out via the wires to identify the power requirements of the PD, as well as other information. This is referred to as classification.

SUMMARY

A PoE system is disclosed where only one twisted wire pair is used for duplex differential data communications between a PSE and the PD. The twisted wire pair is shielded by a surrounding conductor to reduce ambient noise coupling into the wire pair. The shield conductor may be grounded at the PSE end.

The wires are connected to a center tap auto-transformer in the PSE and the PD, where the center tap provides a DC (and low frequency) connection to both wires equally. Therefore, both wires carry equal voltages and source currents during a low power, low frequency handshaking phase and while the PSE supplies the full PoE voltage to the PD. The shield conductor conducts the return current for the handshaking phase and the PoE power transmission.

In one embodiment where the PSE may only determine the PD PoE requirements during the classification phase, the PD presents a detection signature, such as a 25 kohm resistor, between the wires (via the auto-transformer) and the shield conductor. The PSE detects the signature resistance in order to determine that the PD is PoE-compatible. In another embodiment where the PSE may determine the PD PoE requirements prior to the detection phase, the PSE probes the PD with a detection current and the PD presents a detection signature, such as a constant voltage shunt with a current limit between the wires (via the auto-transformer) and the shield conductor. The PSE detects the subsequent signature voltage in order to determine if the PD requires classification prior to the application of full voltage.

Next, the PSE may determine the PD PoE power requirements during a low power classification routine over the wire pair (via the auto-transformer) and shield conductor. In embodiments where the PSE may have determined the PD PoE power requirements before the detection phase, the PSE may skip the classification phase and proceed to the power-up phase.

Once the handshaking phase is over, the PSE closes a power switch to couple a PoE voltage source between the shield conductor (typically ground) and both wires in the wire pair. Both wires in wire pair thus carry the PD current in parallel, enabling the conduction of relatively high currents. The return current is carried by the shield conductor, which can typically carry a higher current than a wire in the wire pair. The DC power conductors thus have low resistance, so there is a lower voltage drop. The shielding of the twisted wire pair greatly reduces ambient noise coupling. This technique allows the cable between the PSE and PD to be up to about a kilometer, rather than the typical 100 m limit for standard PoE.

AC coupling/decoupling circuits are used at the PSE and PD to pass only Ethernet differential data signals to digital communication circuits (e.g., a PHY) via only the wire pair.

Various other embodiments are described.

The terms PSE and PD are used throughout this disclosure to identify equipment that supplies power and equipment that receives the power, and such equipment/devices are not limited to Ethernet equipment/devices unless specified.

BRIEF DESCRIPTION OF THE DRAWINGS

Elements that are the same or equivalent are labeled with the same numeral.

DETAILED DESCRIPTION

Figure 1:
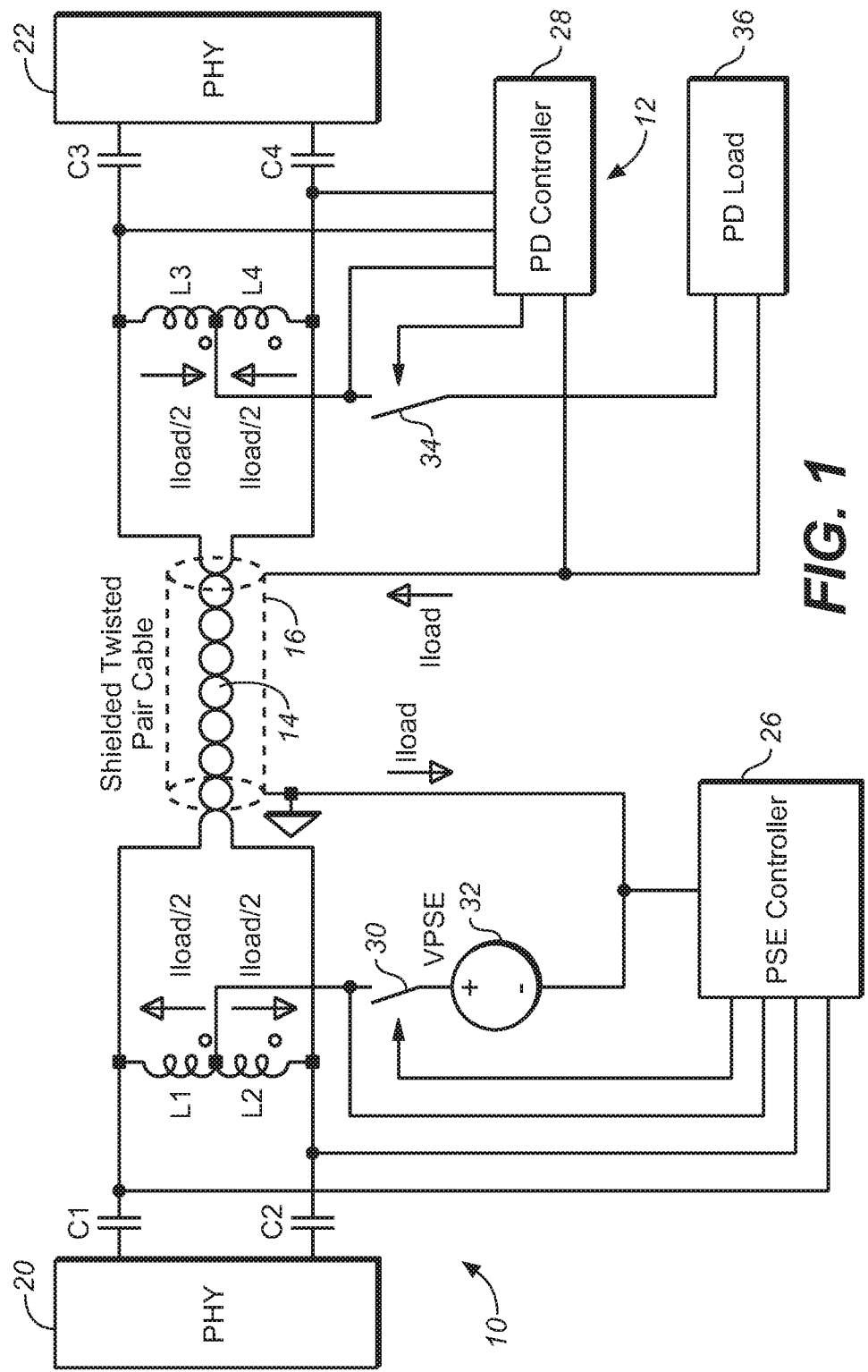
FIG. 1 illustrates a PoE system, in accordance with one embodiment of the invention, using a shielded twisted wire pair for conducting all the handshaking signals, the full PoE DC voltage, and the differential Ethernet signals.

FIG. 1 illustrates pertinent functional units in a PoE system in accordance with one embodiment of the invention.

A PSE 10 and PD 12 are shown coupled via a single twisted wire pair 14 that is surrounded by a shield conductor 16. The shield conductor is grounded and greatly reduces ambient noise signals coupling into the wire pair 14.

The wire pair 14 conducts Ethernet differential data signals. The capacitors C1-C4 pass the differential data signals and block DC signals. A PHY 20 on the PSE side and a PHY 22 on the PD side include conventional analog and digital processing circuitry for the data communications between the PSE 10 and PD 12. The wire pair 14 conducts the signals bi-directionally (duplex communications). The Ethernet data portion of the circuit may be conventional and is not relevant to the present invention. In another embodiment, AC coupling capacitors are not used, and the PHYs 20 and 22 are AC-coupled via transformers that reject common mode signals (such as DC power signals) on the wire pair 14.

Inductors L1-L4 essentially only conduct DC signals (and low frequency signals) and block AC signals (e.g., Ethernet data). Since L1 and L2 have a common node, and L3 and L4 have a common node, the wires in the wire pair 14 carry the same DC voltage applied to the common node of the inductors L1 and L2. Half the PD current flows through each of the four inductors L1-L4. The inductors L1 and L2 form a center tap auto-transformer, and the inductors L3 and L4 form another center tap auto-transformer. Typically, the shield conductor 16 is coupled to a reference voltage, such as ground.

A PSE controller 26 receives both AC and DC signals on the wire pair 14 and is connected to the shield conductor 16. In one embodiment, the PSE controller 26 can transmit both AC and DC signals to the PD controller 28 via the wire pair 14 and the shield conductor 16. The PSE controller 26 may be an IC that performs various routines under the control of a processor, firmware, a state machine, etc. The PSE controller 26 performs a handshaking routine with the PD controller 28 to detect that the PD 12 is PoE-enabled and to obtain further information (e.g., a classification signature) from the PD 12 conveying the PoE requirements of the PD 12. The PD controller 28 may be an IC that performs the various routines under the control of a processor, firmware, state machine, etc.

The PD controller 28 carries out the handshaking routine in response to signals by the PSE controller 26 to convey its required PoE information in order for the PSE 10 to supply the proper voltage and power to the PD 12 up to a maximum power level (defined in the classification signature).

Upon powering up of the system, the PSE controller 26 provides a limited current or voltage (e.g., 5V) via the wire pair 14 (conducting in parallel) and the shield conductor 16 to test for a signature response from the PD 12 that identifies that the PD 12 is PoE-enabled. This is called the detection phase. Various detection signature techniques can be used, such as connecting a 25 kohm resistor between the wire pair 14 and the shield conductor 16. The signature device within the PD controller 28 is connected between the common node of the inductors L3 and L4 and the shield conductor 16. The characteristics of the signature device are detected by the PSE controller 26 by sensing a resulting voltage or current via the common node of the inductors L1 and L2 and the shield conductor 16. In embodiments where the PD PoE requirements may only be obtained through the classification phase and a valid signature resistance is not detected, the PSE controller 26 may not continue on with the handshaking process and opts not to provide power over the wire pair 14 and shield conductor 16. In embodiments where the PD PoE requirements may be known to the PSE prior to the detection phase, the PSE controller 26 may respond to the detection of a valid signature voltage by proceeding to the power up phase and skip the classification phase.

In embodiments where the PD PoE requirements may only be determined in the classification phase and a proper signature resistance is identified by the PSE controller 26, additional low current or voltage signals are generated by the PSE controller 26 during the classification phase to identify details regarding the PoE requirements of the PD 12. In embodiments where PoE requirements of the PD may already be known to the PSE prior to the detection phase and the proper signature voltage is identified by the PSE, the PSE may skip the classification phase and proceed to the power-up phase.

For embodiments where the PD PoE requirements may only be determined in the classification phase, the PSE controller 26 ramps up the voltage to the PD controller 28 via the wire pair 14 (the wires conduct the same voltage or current in parallel) and shield conductor 16 during the classification phase. This low power is used to power the PD controller 28 at this stage. The PSE controller 26 generates either one pulse (indicating it is a Type 1 PSE) or two pulses (indicating it is a Type 2 PSE). The PD controller 28 responds to the classification pulses with certain current levels to identify whether the PD 12 is Type 1 or Type 2. A Type 1 PD requires less than 13 W. A Type 2 PD requires up to a maximum of 25.5 W. Various classes (e.g., five classes), each associated with a maximum average current level and a maximum instantaneous current level, within these types may also be identified. IEEE standards specify details of the routines. Other classification routines may be used. The PSE controller 26 may use this power demand information to determine if the PSE 10 can supply the required power to the PD 12, and the PD controller 28 uses the information to determine if the PD 12 can fully operate with the PSE 10. There are maximum time windows for the detection and classification phases (e.g., 500 ms). Up to this point, all low power handshaking is conducted via the wire pair 14 (where the two wires conduct the same voltage and current) and the shield conductor 16.

For embodiments where the PD PoE requirements may be determined prior to the detection phase and the PSE has detected an invalid signature voltage, the PSE momentarily pulses the voltage between the wire pair 14 and the shield conductor 16 low to the PD controller 28 in order to initiate the classification phase. The PD is powered by rectifying the voltage between the wire pair 14 and the shield conductor 16. The PD may respond to the PSE pulse by also momentarily pulsing the voltage low between the wire pair 14 and the shield conductor 16 to the PSE controller 26 in order to indicate that it is present. The PSE may respond to the PD presence pulse by sending a series of short and long low pulses to convey serial information to the PD. Subsequent to the conveyed serial information, the PD may either pull low or not pull low the voltage between the wire pair 14 and the shield conductor 16 to signal to the PSE controller 26 in response to the PSE pulling the voltage to the PD controller 28 low. If the combination of the received pulses from the PD to PSE represents a valid and compatible PD, the PSE may proceed to the power-up phase.

Other types of detection and classification routines may be standardized and implemented in the future.

On completion of the detection and classification phases, the PSE controller 26 closes the power switch 30 to couple the full PSE voltage (VPSE) from the voltage source 32 between the wire pair 14 (via the inductors L1 and L2) and the shield conductor 16.

Once the PD controller 28 has detected that the undervoltage lockout (UVLO) threshold has been exceeded, the PD controller 28 closes a power switch 34 to couple the DC power to the PD load 36. The closing of the switch 34 also powers the PHY 22 and other digital communications circuitry. The PD load 36 may be any load, such as a camera, sensors, etc. At this point, the PD 12 begins to operate normally. Ethernet communications are conducted between the PSE 10 and PD 12 via the wire pair 14 (the shield conductor 16 is not involved with data communications), while DC power is conducted using the wire pair 14 and the shield conductor 16.

Since, both wires in the wire pair 14 carry the PoE source current, and the shield conductor 16 carries the return current, high currents may be drawn by the PD 12. Further, the shield conductor 16, which may be a wire mesh surrounding the wire pair 14, blocks ambient noise being coupled onto the wire pair 14. This allows the PSE 10 and PD 12 to be separated by over one kilometer (depending on the data rate), rather than the typical maximum separation of 100 meters for an unshielded twisted wire pair. The low power handshaking uses the wire pair 14 and the shield conductor 16 to carry the low frequency voltages and currents, and the full DC power is also carried by the wire pair 14 and shield conductor 16.

If the PSE controller 26 and the PD controller 28 do not need to transmit or receive any signals across the wires in the wire pair 14, the direct connection of the controllers 26 and 28 to the wires (shown in FIG. 1) may be deleted, so that there will only be a DC (or low frequency) connection between the controllers 26 and 28 and the wire pair 14 via the inductors L1-L4. In one embodiment, the controllers 26 and 28 are directly connected to the wires, as shown in FIG. 1, but only one of the wires in the wire pair 14, along with the shield conductor 16, is used for conducting the low power signals during the handshaking routine. In another embodiment, the controllers 26 and 28 are directly connected to the wires, as shown in FIG. 1, where all low power signals during the handshaking routine are conducted by the two wires, and the shield conductor 16 is not used for conducting the handshaking signals (the shield conductor 16 is still used for conducting the full PoE voltage).

Figure 2:
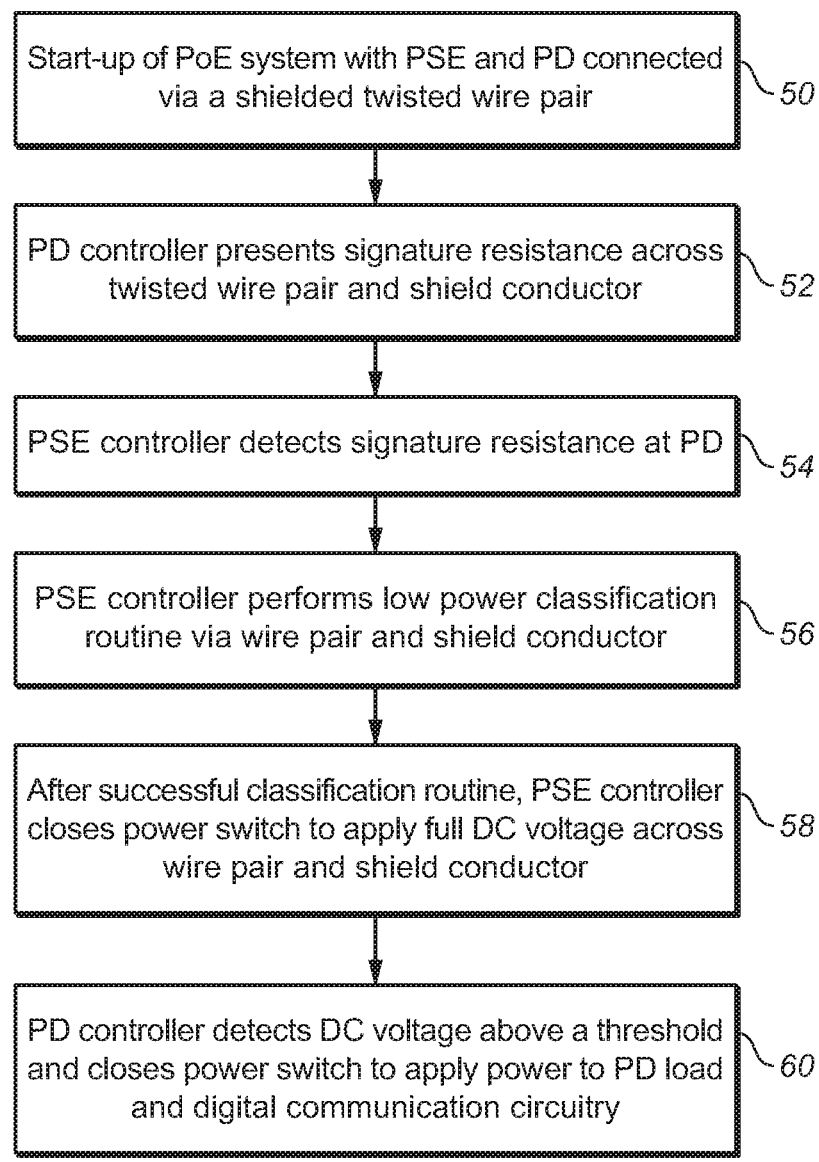
FIG. 2 is a flowchart identifying various steps performed by the system of FIG. 1.

FIG. 2 identifies various steps performed in one embodiment of the invention where the PSE may only determine the PD PoE requirements during the classification phase. Other routines would apply to other types of detection and classification methods, described above.

In step 50, the start-up of the system begins, where the system includes a PSE and PD connected via a shielded twisted wire pair. Center tap auto-transformers are used to couple DC signals and low frequency handshaking signals to PSE and PD controllers.

In step 52, the PD controller presents a signature resistance across the wire pair and the shield conductor to identify the PD as PoE-compatible.

In step 54, the PSE controller detects the signature resistance.

In step 56, the PSE controller then performs a low power classification routine using the wire pair and the shield conductor, where both wires in the wire pair conduct current in parallel.

In step 58, the PSE controller closes a power switch to couple a DC voltage source between the wire pair, via the auto-transformer, and the shield conductor.

In step 60, the PD controller detects the voltage and, if above a threshold, closes a power switch to couple the DC voltage to the PD load and digital circuitry components.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A Power over Ethernet (PoE) system comprising:
Power Source Equipment (PSE) configured to be coupled to a Powered Device (PD) via a single wire pair and a shield conductor surrounding the wire pair, wherein the PSE is configured to communicate differential data signals over the wire pair;
first AC coupling components connected between first digital communications circuitry in the PSE and the wire pair, wherein the first AC coupling components comprise capacitors;
a first inductor having a first terminal coupled to a first wire in the wire pair;
a second inductor having a first terminal coupled to a second wire in the wire pair;
the first inductor having a second terminal coupled to a second terminal of the second inductor at a first common node, wherein the first inductor and the second inductor comprise a center-tapped auto-transformer;
the PSE comprising a PSE controller, wherein the PSE controller is configured to perform a low power handshaking routine, via the wire pair and the shield conductor, to determine PoE requirements of the PD, wherein the first wire and the second wire carry handshaking signals in parallel via the first inductor and the second inductor; and
a first power switch in the PSE, the PSE controller being configured for closing the first power switch after the handshaking routine, resulting in a first terminal of a DC voltage source being coupled to the first common node, and a second terminal of the voltage source being coupled to the shield conductor, for supplying a DC voltage to the PD to power the PD.

2. The circuit of claim 1 wherein the first digital communications circuitry comprises a one wire-pair Ethernet PHY.

3. The circuit of claim 1 wherein the PSE controller is configured to detect a signature of the PD, as part of the handshaking routine, to determine if the PD is PoE-compatible, wherein the PD includes a signature component coupled across the wire pair and the shield conductor for detection of the signature component by the PSE controller.

4. The circuit of claim 1 wherein the handshaking routine performed by the PSE classifies power requirements of the PD.

5. The circuit of claim 1 further comprising the PD, wherein the PD comprises:
second AC coupling components connected between second digital communications circuitry in the PD and the wire pair;
a third inductor having a first terminal coupled to the first wire in the wire pair;
a fourth inductor having a first terminal coupled to the second wire in the wire pair;
the third inductor having a second terminal coupled to a second terminal of the fourth inductor at a second common node; and
the PD comprising a PD controller, wherein the PD controller is configured to perform the low power handshaking routine, in conjunction with the PSE controller, via the wire pair and the shield conductor, to determine the PoE requirements of the PD, wherein the first wire and the second wire carry the handshaking signals in parallel via the third inductor and the fourth inductor.

6. The circuit of claim 5 further comprising a second switch in the PD coupled between the second common node and a PD load to supply the DC voltage to the PD load when the second switch is closed.

7. The circuit of claim 6 wherein the PD load has a first terminal coupled to the shield conductor and a second terminal coupled to the second switch.

8. The circuit of claim 5 wherein the PD controller includes a signature component coupled across the wire pair and the shield conductor for detection of the signature component by the PSE controller, as part of the handshaking routine, to determine if the PD is PoE-compatible.

9. The circuit of claim 8 wherein the signature component comprises a signature resistance coupled between the second common node and the shield conductor.

10. The circuit of claim 1 wherein the PSE controller is coupled to the first wire and the second wire in the wire pair to communicate AC signals via the wire pair.

11. The circuit of claim 10 wherein the PSE controller is also coupled to the first common node of the first inductor and the second inductor, and also coupled to the shield conductor.

12. The circuit of claim 1 wherein the low power handshaking routine determines power requirements of the PD.

13. A method performed in a Power over Ethernet (PoE) system, the system including Power Source Equipment (PSE) coupled to a Powered Device (PD) via a single wire pair and a shield conductor surrounding the wire pair, wherein the PSE is configured to communicate differential data signals over the wire pair, the system also including a first inductor having a first terminal coupled to a first wire in the wire pair, and including a second inductor having a first terminal coupled to a second wire in the wire pair, the first inductor having a second terminal coupled to a second terminal of the second inductor at a first common node, the method comprising:
    performing a low power handshaking routine, via the wire pair and the shield conductor, using a PSE controller, to determine PoE requirements of the PD, wherein the first wire and the second wire carry handshaking signals in parallel via the first inductor and second inductor, wherein the first inductor and the second inductor comprise a center-tapped auto-transformer; and
    operating a first power switch in the PSE by the PSE controller, wherein the PSE controller closes the first power switch after the handshaking routine, resulting in a first terminal of a DC voltage source being coupled to the first common node, and a second terminal of the voltage source being coupled to the shield conductor, for supplying a DC voltage to the PD to power the PD.

14. The method of claim 13 further comprising:
    communicating the differential data signals over the wire pair between first digital communications circuitry in the PSE and second digital communications circuitry in the PD.

15. The method of claim 13 wherein the low power handshaking routine comprises:
    detecting a signature component in the PD coupled across the wire pair and the shield conductor for detection of the signature component by the PSE controller.

16. The method of claim 13 wherein the handshaking routine performed by the PSE classifies power requirements of the PD.

17. The method of claim 13 wherein the PD includes a third inductor having a first terminal coupled to the first wire in the wire pair, and a fourth inductor having a first terminal coupled to the second wire in the wire pair, the third inductor having a second terminal coupled to a second terminal of the fourth inductor at a second common node, the method further comprising:
    closing a second switch in the PD, coupled between the second common node and a PD load, to supply the DC voltage to the PD load after the handshaking routine.

* * * * *